Patented May 15, 1923.

1,455,396

UNITED STATES PATENT OFFICE.

WILLIAM W. HESSON, OF TORONTO, ONTARIO, CANADA.

COMPOSITION FOR TOBACCO PIPES.

No Drawing.    Application filed August 9, 1918.   Serial No. 249,190.

*To all whom it may concern:*

Be it known that I, WILLIAM WALLACE HESSON, a subject of the King of Great Britain, and resident of the city of Toronto, county of York, Province of Ontario, in the Dominion of Canada, have invented certain new and useful Improvements in Composition for Tobacco Pipes, described in the following specification.

The principal objects of this invention are to produce a substitute material for briar root in the manufacture of tobacco pipes which will be the equivalent of and in some respects will surpass the briar root and to devise a composition of materials which will enable the moulding of pipes which will be strong and durable and will present an extremely fine finish.

The principal features of the invention consist in the novel mixture of materials as herein set forth and in the construction of the pipe whereby the stem and bowl are reinforced and the bottom of the bowl is protected by an extension portion of the stem reinforcing member.

The materials which I use in the formation of the pipe bowl and stem are preferably as follows, in the proportions given, though it must be understood that these proportions may be varied considerably and substitutes for some of the materials may be used. The composition comprises, ground corn cob, preferably dried in tan bark which imparts a woody smell to the pipe, 4 parts; asbestos fibre, 1 part; sodium silicate, 2 parts; nicotine or tobacco juice for deepening colour, ¼ part; slippery elm bark, ¼ part; gelatine, ¼ part; gum arabic, ¼ part; Irish moss, ¼ part.

These ingredients are thoroughly mixed together into a homogenous mass, the sodium silicate providing sufficient moisture to thoroughly unite the various elements in a plastic mass. The mass thus formed is worked into a suitable mold which is preferably lined with lead foil or waxed fabric sausage casing or similar material which will readily disengage from the mold and will also form a smooth moulding surface.

A pipe constructed as described and with the materials set forth, will be very neat and attractive in appearance and will also be extremely serviceable and light. The corn cob forms the major part of the mixture of which it is composed and this mixed with the asbestos fibre and with the fibrous material of the Irish moss and slippery elm bark held together by the sodium silicate, gelatine and gum arabic as binders, forms a very hard and tough body. The gum arabic and gelatine assist in the adhesive qualities and also impart a very desirable gloss to the surface similar to that obtained in burnishing briar root. The outer surface of the pipe when moulded may be buffed to a high polish or in cheaper forms of pipes, they may be dipped in a suitable lacquer.

What I claim as my invention is:—

1. A composition for making tobacco pipes, comprising, ground corn cob about 4 parts, asbestos fibre about 1 part, a vegetable fibre about ½ part, and an adhesive material in sufficient quantity to form a plastic moldable mass and of a nature which will dry hard.

2. A composition for making tobacco pipes comprising, ground corn cob about 4 parts, asbestos fibre about 1 part, slippery elm bark about ¼ part, Irish moss about ¼ part, sodium silicate about 2 parts, gum arabic about ¼ part, all mixed together to form a moldable plastic mass.

W. W. HESSON.